(12) United States Patent
Vaid et al.

(10) Patent No.: US 8,065,398 B2
(45) Date of Patent: Nov. 22, 2011

(54) METHOD AND APPARATUS FOR APPLICATION-DRIVEN STORAGE PROVISIONING ON A UNIFIED NETWORK STORAGE SYSTEM

(75) Inventors: Aseem Vaid, Santa Clara, CA (US); Rajesh Rajashekar, Sunnyvale, CA (US); Ronghuei A. Su, Cupertino, CA (US); Rimple Patel, Fremont, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 661 days.

(21) Appl. No.: 11/725,660

(22) Filed: Mar. 19, 2007

(65) Prior Publication Data

US 2008/0235240 A1  Sep. 25, 2008

(51) Int. Cl.
*G06F 15/177* (2006.01)

(52) U.S. Cl. .......................... 709/220; 709/224; 711/170

(58) Field of Classification Search .................. 709/220
See application file for complete search history.

(56) References Cited

U.S. PATENT DOCUMENTS

| | | | |
|---|---|---|---|
| 6,538,669 B1* | 3/2003 | Lagueux et al. | 715/764 |
| 6,598,174 B1* | 7/2003 | Parks et al. | 714/6 |
| 7,043,619 B1* | 5/2006 | Knight | 711/170 |
| 7,158,907 B1* | 1/2007 | Soldo | 702/108 |
| 7,191,285 B2* | 3/2007 | Scales et al. | 711/114 |
| 7,315,903 B1* | 1/2008 | Bowden | 709/250 |
| 7,596,615 B2* | 9/2009 | Satkunanathan et al. | 709/224 |
| 2002/0129216 A1* | 9/2002 | Collins | 711/170 |
| 2004/0073539 A1* | 4/2004 | Dettinger et al. | 707/3 |
| 2004/0186657 A1* | 9/2004 | Ritter et al. | 701/114 |
| 2004/0210649 A1* | 10/2004 | Bhogal et al. | 709/222 |
| 2004/0221022 A1* | 11/2004 | Gracyk | 709/220 |
| 2005/0143968 A9* | 6/2005 | Odom et al. | 703/21 |
| 2005/0193103 A1* | 9/2005 | Drabik | 709/221 |
| 2005/0198233 A1* | 9/2005 | Manchester et al. | 709/221 |
| 2005/0240727 A1* | 10/2005 | Shah et al. | 711/114 |
| 2006/0085522 A1* | 4/2006 | Spry | 709/220 |
| 2006/0112219 A1* | 5/2006 | Chawla et al. | 711/114 |
| 2006/0117132 A1* | 6/2006 | Gray et al. | 711/100 |
| 2006/0117309 A1* | 6/2006 | Singhal et al. | 717/162 |
| 2007/0143454 A1* | 6/2007 | Ma et al. | 709/222 |
| 2008/0123559 A1* | 5/2008 | Haviv et al. | 370/255 |
| 2008/0201303 A1* | 8/2008 | Bragiel et al. | 707/3 |
| 2008/0235240 A1* | 9/2008 | Vaid et al. | 707/10 |

* cited by examiner

*Primary Examiner* — Firmin Backer
*Assistant Examiner* — Hamza Algibhah
(74) *Attorney, Agent, or Firm* — Blakely, Sokoloff, Taylor & Zafman LLP

(57) ABSTRACT

A configuration for a network-accessible storage device is prepared by automatically computing a configuration parameter based on a setup parameter that pertains to an application-level function of the network accessible device. Software and systems that implement or use aspects of the invention are also described and claimed.

15 Claims, 6 Drawing Sheets

Create LUN Wizard

LUN Parameters

Specify the following parameters for creating a LUN.

Name:
The name of the LUN.    410

Size:
The size of the LUN.    420 — 20    GB (Gigabytes)

Type:
Select the type of the LUN.    430 — Windows

Description:
An optional description of the LUN.    440 — test LUN description

< Back | Next > | Cancel | Help

METHOD AND APPARATUS FOR APPLICATION-DRIVEN STORAGE PROVISIONING ON A UNIFIED NETWORK STORAGE SYSTEM

FIELD

The invention relates to storage server configuration. More specifically, the invention relates to simplifying storage server configuration tasks.

BACKGROUND

Contemporary data processing systems can consume and/or produce large quantities of data. In a networked or distributed environment, it is often useful to store this data so that many different systems can access it. Network storage servers have been developed to provide data storage services to client systems, in order to meet that need.

Storage servers are often composed of subsystems that must be configured correctly and consistently to operate as intended. Successful storage server configuration traditionally requires a fairly detailed understanding of mass storage device operations, Redundant Array of Independent Disks ("RAID") array principles, filesystem structures, protocol and network communications, and similar topics. However, some environments that could benefit from the functionality of a storage server cannot justify the expense of employing an adequately-qualified person to administer the server. Methods to reduce the difficulty of configuring, monitoring and maintaining a network-accessible storage server may be of value in this field.

SUMMARY

Embodiments of the invention combine a storage server with a configuration "wizard" to configure the server. Methods by which the wizard operates, and software to implement these methods, are also described and claimed.

BRIEF DESCRIPTION OF DRAWINGS

Embodiments of the invention are illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

FIG. 4 is a screenshot showing a graphical user interface display presented by a wizard according to an embodiment of the invention.

DETAILED DESCRIPTION

Embodiments of the invention automatically prepare complex storage server configurations based on application-targeted information provided by an operator or administrator, environmental information discovered independently by the storage server and/or information about preferred configurations stored in a database.

Figure 1:
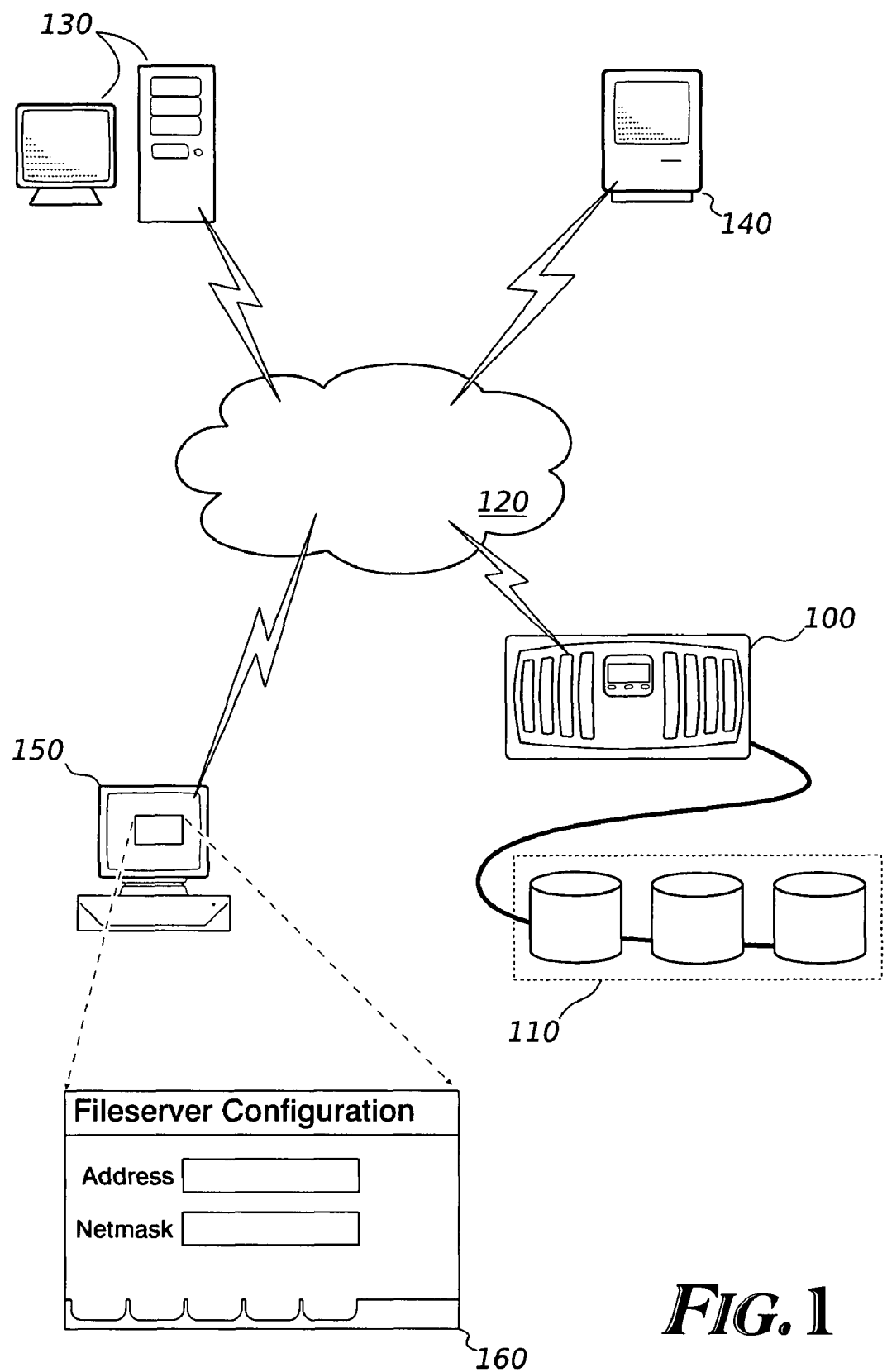
FIG. 1 shows an environment where an embodiment of the invention is used.

FIG. 1 shows a sample environment where an embodiment of the invention is used. A storage server 100 is connected to a group of mass storage devices 110. Mass storage devices 110, which may be Integrated Device Electronics ("IDE") hard disks, Small Computer Systems Interface ("SCSI") hard disks, Fiber Channel ("FC") hard disks, or other types of storage devices, are often operated as a Redundant Array of Independent Disks ("RAID array") to increase data transfer speed or storage reliability. Storage server 100 is connected to a data communication network 120, which may be a local area network ("LAN"), a wide-area network ("WAN"), or a distributed data network such as the Internet, which includes various LANs and WANs. Client computer systems 130 and 140 communicate with storage server 100 via data communication network 120 and exchange commands, responses and data with the storage server to cause the server to store or retrieve data on mass storage devices 110. Computer system 150 is an administration console that hosts an application to configure and monitor storage server 100; element 160 depicts a sample user interface display of the application.

Figure 2:
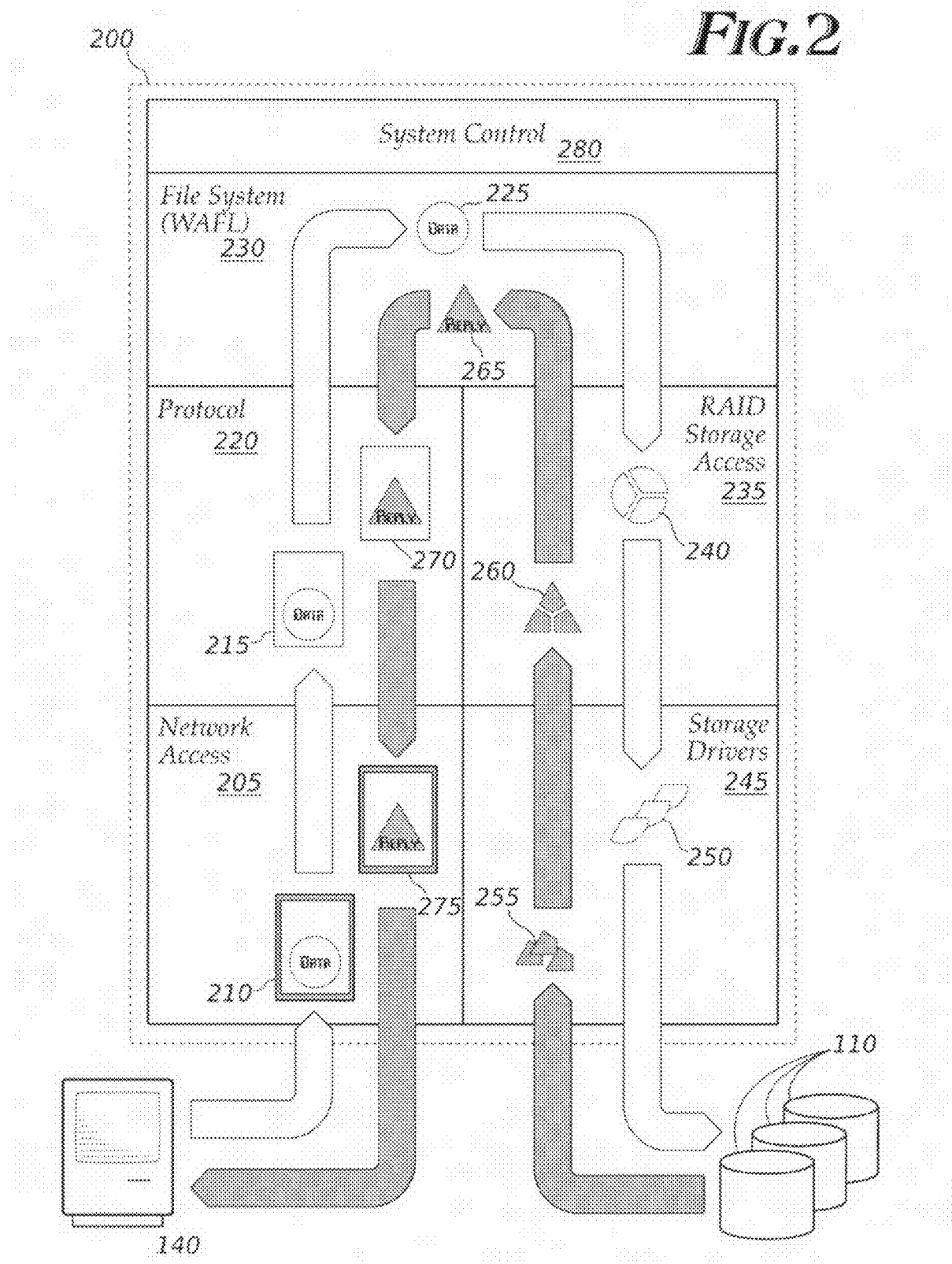
FIG. 2 shows how subsystems of a storage server cooperate to fulfill a client request.

A storage server like that shown as element 100 of FIG. 1 is a complex system with many interacting subsystems. FIG. 2 shows how some of these subsystems cooperate to execute a data storage request from a client computer system. Client system 140 transmits a message 210 to the storage server, logical elements of which are shown within dashed line 200. Message 210 is received by a network access layer 205 and the payload 215 of the message 210 is passed up to protocol handling layer 220. Protocol-specific checks (for example, parameter validity and permission checks) may be performed, then a data portion 225 of the client's message 215 is passed to a file system layer 230. (One possible file system is called the "Write Anywhere File Layout," or "WAFL.")

The file system layer 230 determines where in the logical storage space of the storage server the data 225 should be placed, and passes the data to a RAID storage access layer 235. RAID storage access 235 divides the data 225 into portions 240 according to the redundancy and error correction scheme in use and passes the portions to storage drivers 245, which interact with mass storage devices 110 to store the individual portions 250.

If client 140's message elicits a response from storage server 200, the response may be constructed in essentially the reverse order: storage drivers 245 read data fragments 255 from mass storage devices 110. RAID storage access layer 235 reassembles fragments 255 into a buffer 260, which is further processed into a reply 265 by file system layer 230. Reply 265 is encapsulated by protocol layer 220 into a protocol-compliant structure 270, which is itself incorporated into a network message 275 by network access layer 205. Network message 275 is transmitted back to client 140.

The operation and interactions of these various logical layers are coordinated by system control layer 280, which directs storage server operation according to a number of configuration parameters (not shown in FIG. 2). The configuration parameters govern things like the network address used by the network access layer, the protocols accepted by the storage server, the layout of data on the mass storage devices, RAID levels to be used by the storage server, backup strategies and timing, and so on. Contemporary storage servers provide a wide range of configuration "knobs" (adjustable parameters) to permit a sophisticated administrator to fine-tune the server's operations to suit users' needs.

Figure 3:
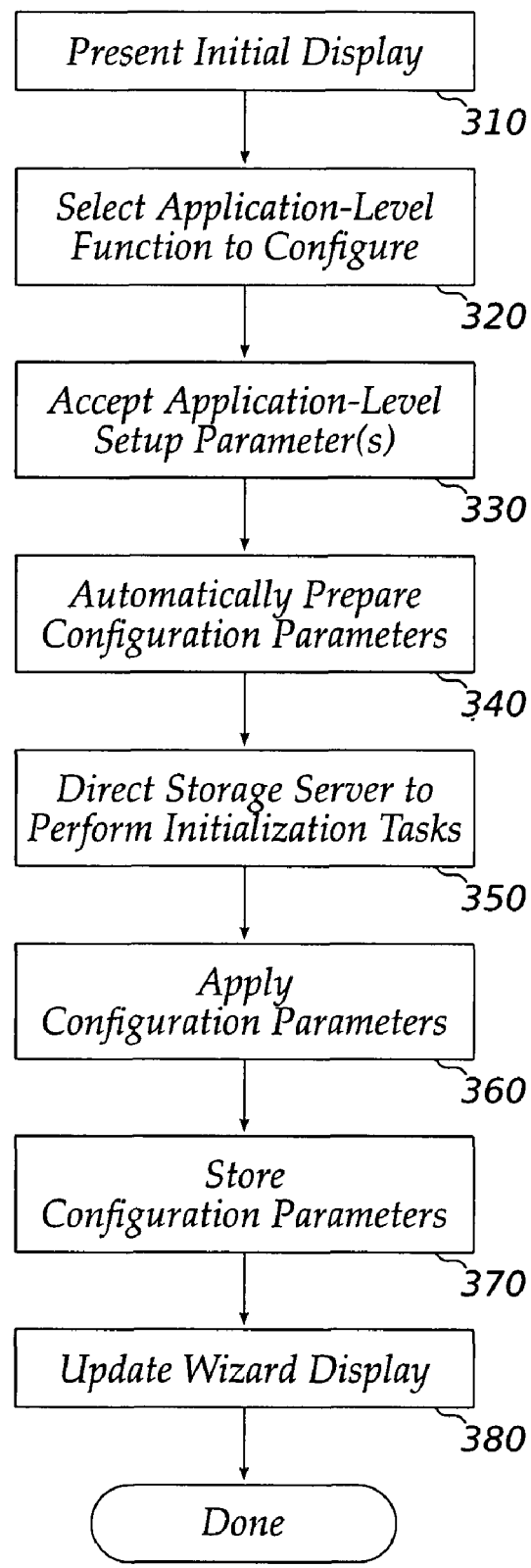
FIG. 3 outlines the operation of an embodiment of the invention.

Unfortunately, not all storage server administrators can be expert in the meanings and interactions of storage server configuration parameters. To make the power and functionality of an enterprise-class storage server available to less-sophisticated users, embodiments of the invention combine logic, heuristics, and best-practices information in a management tool to prepare server configurations based on performance goals expressed in terms of end-user applications. Configuration and management tools that operate along these lines are in use for other computer administration tasks, and in that context are often called "wizards." This term is adopted here for management tools that implement embodiments of the invention. Often, but not invariably, the term "wizard" implies the use of a Graphical User Interface, or "GUI." A wizard according to an embodiment of the invention can display information and accept user input through a GUI. A wizard can also interact with a user and collect information to configure a system through a command-line interface ("CLI"). A CLI is a text-based interface that may be useful when a graphical display terminal is unavailable. A CLI wizard can accomplish system configuration even when only a low-bandwidth connection (e.g. an analog modem connection) is available for communications between the wizard and the system administrator. FIG. 3 outlines the operation of a GUI configuration wizard for managing a storage server.

The wizard causes an initial display to be presented to the user (310). The display may appear on an administration console such as system 150 shown in FIG. 1. The logical operations performed to prepare data for display and to process user input may also occur on the administration console machine, or they may occur on the storage server itself (i.e. the administration console may serve merely as an interface device to display information to the user and to relay user input to the wizard.)

Presenting the initial display (and any subsequent displays and other user interactions) may be accomplished by directly drawing the information on a screen or other display device, by calling operating system or library routines to do the drawing, by transmitting an encoded representation of the desired display to a user interface application (for example, transmitting a Hypertext Markup Language ("HTML") or Extensible Markup Language ("XML") document to a browser application), or by other means well known to those of skill in the art. Low-level user interface details will not be called out specifically in the following description.

The user selects an application-level function to configure (320). An application-level function is a function or service that the storage server provides to one or more network client systems. Application-level functions are usually associated with a standard interface protocol, so that any sort of client and any sort of server that implement the standard protocol can interact successfully, regardless of the client's or server's implementation "behind" the interface.

As an example of an application-level function, consider a storage volume that can be used by one or more network client systems that implement the Server Message Block ("SMB") protocol. A standards-compliant SMB implementation must respond to certain messages in certain predetermined ways, but the protocol does not generally force the server to produce the required responses in a particular way. Thus, although SMB may require that a server accept data for storage, and retrieve and transmit the data later upon request, the protocol does not demand that the data be stored on a particular type of medium, in compressed or uncompressed form, or otherwise limit the server's operations to accept, store, and retransmit the data.

Other application-level functions that can be configured by a wizard according to an embodiment of the invention include a Network File System ("NFS") storage volume and a network-accessible block-organized storage volume (also known as a Storage Area Network ("SAN") Logical Unit ("LU")). Conceptually, these various application-level functions are fairly similar, but the specific functional details and configuration requirements vary widely.

The user may select the application-level function from a list such as a drop-down menu, from a series of radio buttons, or by using a similar interface feature. FIG. 4 shows a screenshot of a sample wizard GUI 400; in this screenshot, the user is entering the small number of application-level parameters (410-440) that the wizard uses to configure a Windows storage volume. Returning to FIG. 3, the application-level setup parameters entered by the user are accepted (330). Application-level setup parameters are pieces of information that describe the application-level function being configured. They may not correspond directly (or even indirectly) to configuration parameters that control the operation of storage server subsystems. Instead, they relate closely to the application-level function being configured, or are provided largely for the user's convenience (e.g. the "description" entered in field 440 of FIG. 4).

In the simplest case, it may be possible to automatically configure the application-level function with no more information than a user-entered name for the network volume. However, other setup parameters might also be needed in some instances. For example, the user might provide the size of the volume or the identity of clients permitted to access the volume.

After receiving the one or more setup parameters, the management tool automatically prepares configuration parameters to control the storage server and to cause it to provide the desired application-level function (340). In the network volume example, configuration parameters might include storage settings to allocate storage space on one or more mass storage devices, protocol settings to cause the storage server to respond to requests from network clients, backup settings to cause the allocated storage to be backed up appropriately, and so on. Configuration parameters control the operation of various internal subsystems of the storage server. Some sample configuration parameters prepared automatically from application-level setup parameters appear below.

There is often no one-to-one mapping between application-level setup parameters and the automatically-prepared configuration parameters. For example, a setup parameter that indicates to the wizard that the storage volume is intended to hold data for a Microsoft Exchange™ mail server may cause several configuration differences from an otherwise-identical network storage volume that is intended to hold general user data. Furthermore, the sets of configuration parameters that are affected by two different setup parameters may not be mutually exclusive. For example, setup parameters designating a type of data to be stored or a network protocol to be implemented may both affect a configuration parameter controlling the allocation of blocks within an aggregate.

When a new application-level function is to be configured, the wizard may also cause the storage server to perform certain initialization tasks (350) such as formatting mass storage devices and storing low-level data structures on the storage devices. The automatically-prepared configuration parameters are applied to the storage server (360), and are also stored in non-volatile storage (370) so that the application-level function will continue to be available even if the storage server is reset, restarted, or experiences other operational difficulties.

Finally, the wizard GUI is updated to show the current state of the newly created (or reconfigured) application-level function (380).

A CLI or GUI wizard according to an embodiment of the invention may consist of data and executable instructions (generally, "software") to cause a programmable processor to perform operations as described here. The wizard software may execute on the storage server itself, or on a separate processing device such as a personal computer ("PC"), a personal digital assistant ("PDA"), a cellular telephone, or another programmable device. A wizard executing elsewhere than the storage server may prepare a data file or similar database containing configuration parameters and transmit it to the storage server. The configuration parameters are subsequently used by the storage server to control its operations.

Figure 5:
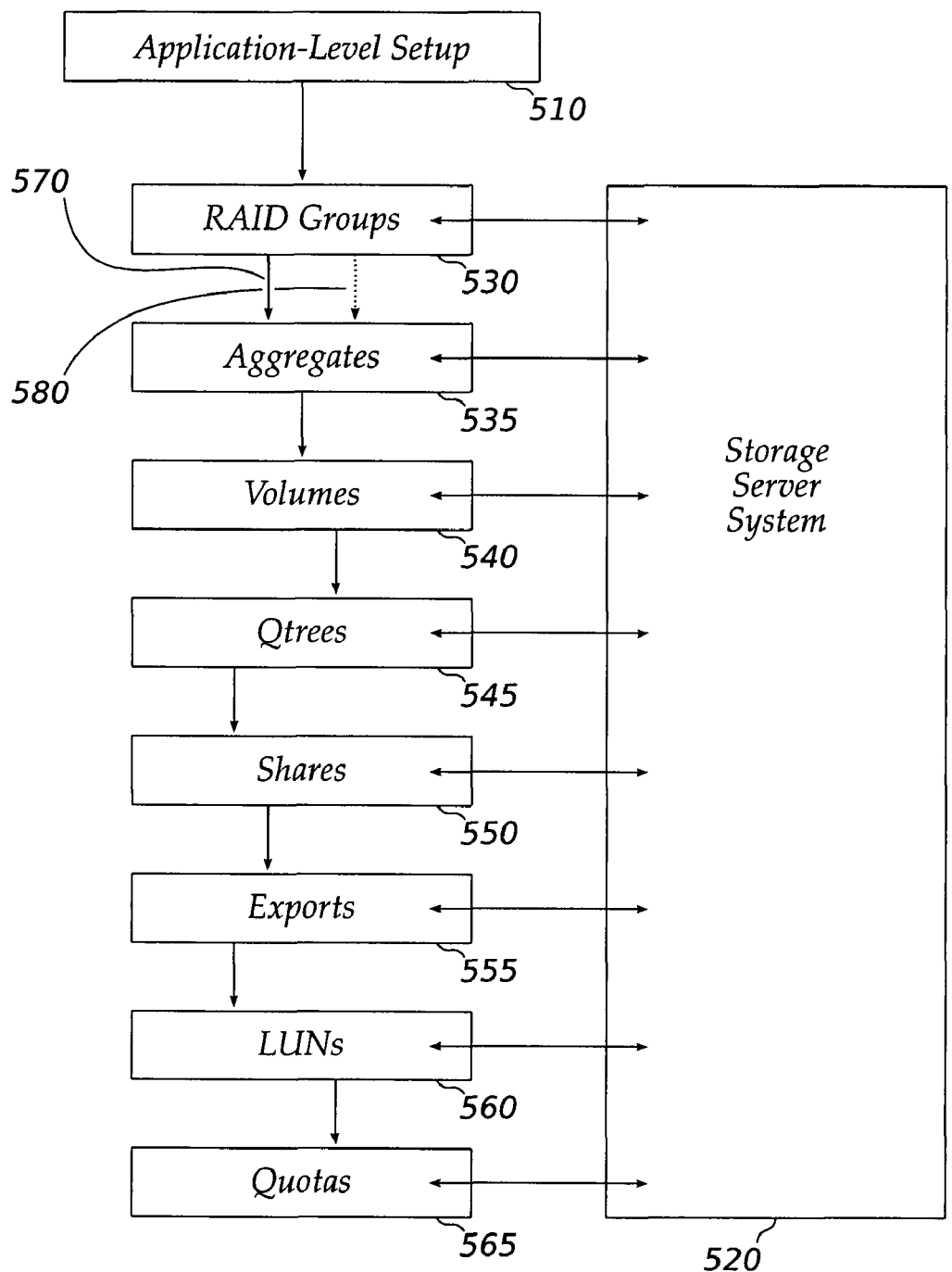
FIG. 5 shows an alternative view of an embodiment of the invention.

FIG. 5 shows an alternate way of visualizing storage server configuration using a wizard according to an embodiment of the invention, and its relationship to the subsystems of a storage server. The application-level setup parameters collected by the wizard are depicted here as Application-Level Setup element 510. A number of subsystem configurations control the operation of storage server system 520, and a single application-level setup state maps to several subsystem configuration states. Subsystems may include RAID groups 530, aggregates 535, volumes 540, Qtrees 545, shares 550, exports 555, Logical Unit Numbers ("LUNs") 560 and quotas 565. (Qtrees are data structures and logic that can be used to enforce disk utilization quotas.) Each of the subsystems is controlled by one or more configuration parameters; the configuration state of each subsystem is indicated by a vertical arrow pointing to the subsystem title. In this conceptual representation, a set of configuration parameters that causes a subsystem to behave in one way is indicated by a vertical arrow 570 in one position, while a different set of configuration parameters that would cause the subsystem to behave in a different way would be indicated by a second vertical arrow 580 displaced horizontally from the first. The horizontal arrows indicate that the configuration parameters affect the operation of storage server system 520.

FIG. 5 is intended to convey the idea that a single application-level function (for example, a shared network volume or a network-accessible block device) is built on a plurality of subsystem configuration settings. It is possible that two different sets of subsystem configurations could cause the storage server to provide the same application-level service. For sophisticated administrators, the flexibility and control available from explicit subsystem-level configuration may be useful, but for unsophisticated users, the simplicity of a single application-level setup may be more valuable. Embodiments of the invention can be thought of as including a mapping or conversion function to prepare a consistent configuration constellation (a set of subsystem configuration states) from application-level setup information. The automatically-prepared configuration constellation is based on the application-level setup parameters, augmented with default configuration values, heuristically-determined values, and information from a database of best-known methods and practices. Although the wizard-created configuration may not be optimal in all situations, it will be acceptable for a broad range of applications (including many applications where the storage server's owner cannot justify the expense of employing highly-trained server administrators).

Mapping application-level setup parameters to storage server configuration parameters as performed by a wizard according to an embodiment of the invention is different from a prior-art configuration dialog that simply collects configuration parameters from the user. Application-level setup parameters need not correspond directly to configuration parameters—a change in one application-level setup parameter may result in two or more storage server configuration parameter changes, and a single storage server configuration parameter may be affected by two or more different application-level setup parameters, according to the mapping procedure.

Table 1 shows a list of application-level setup parameters that may be collected by a wizard to prepare a Storage Area Network ("SAN") logical unit number ("LUN")—a network-accessible block-addressed data storage volume.

TABLE 1

| Application-Level Setup Parameter | Value | Explanation |
| --- | --- | --- |
| NAME | Example LUN | An identifying name |
| SIZE | 1000 | Size of LUN (for example, in megabytes) |
| CLIENT | Windows | Expected client operating system type |

Table 2 shows a corresponding (partial) list of configuration parameters that are automatically generated based on the application-level setup parameters of Table 1. Note that some configuration parameters have no corresponding application-level setup parameter (and vice versa), while other configuration parameters depend (in part) on the same application-level setup parameter.

TABLE 2

| Configuration Parameter | Value | Explanation |
| --- | --- | --- |
| system.name | Example_LUN | From Application-Level Setup, but spaces not allowed. |
| raid.level | 5 | Provides good balance between performance and security for moderately-sized volumes. |
| qtree.security | ntfs | Quota security model chosen based on expected client system type |

One of the benefits of a storage server configuration wizard is that it can hide some configuration complexity from the user. This, in turn, means that less information need be displayed to the user to effectively communicate the server's status, and a smaller amount of information need be collected to configure an application-level function. In other words, embodiments of the invention permit a large number of configuration parameters to be described by a smaller number of application-level setup parameters, and can also condense a large number of operational parameters into a smaller number of status parameters for display to a user. Therefore, some embodiments allow server configuration and monitoring to be performed with physically smaller and/or lower-bandwidth devices than may be required for traditional, subsystem-level configuration and monitoring. Specifically, an embodiment of the invention may present system status information on a hand-held device such as a personal digital assistant ("PDA") or a cellular telephone, and storage server services may be added or modified from such a device over a wireless data connection. This mode of operation would be impractical or impossible with the more-complex traditional configuration.

Figure 6:
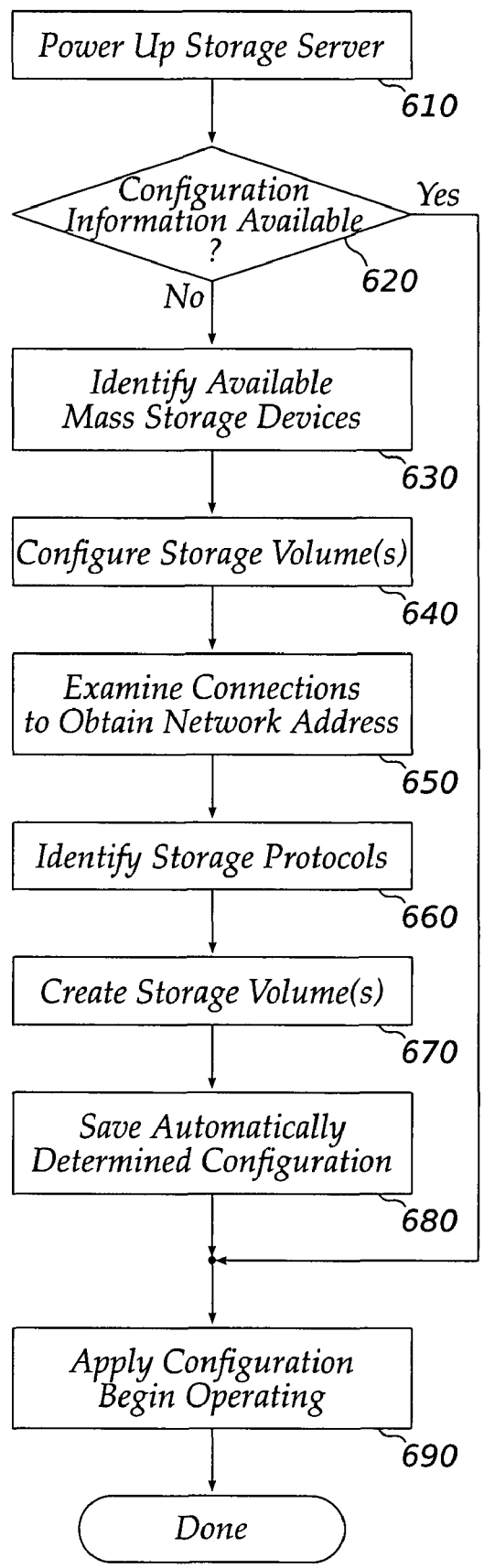
FIG. 6 outlines a method by which an embodiment can automatically configure itself to provide basic functionality.

In some embodiments, a storage server can investigate its environment and automatically configure itself to provide at least a minimum level of functionality. This can allow the storage server to work "out of the box." That is, the server can be unpacked, plugged in, turned on, and used immediately (at least to the minimum level of functionality) without requiring any administrator interaction. FIG. 6 outlines some measures an embodiment can employ to perform automatic configuration. When a new storage server is powered up (610), it checks to see whether configuration information is available to control its operation (620). If it is, the storage server initializes itself and operates according to the configuration information (690). Otherwise, it examines its hardware configuration to determine what mass storage devices are available to store user data (630), and creates configuration data to construct one or more storage volumes on the available storage devices (640). A storage volume is a logical data storage entity that is visible to and useable by clients to store data. A storage volume may be implemented within the storage server by a set of configuration entries that dedicates space on the storage devices to purposes such as actual data storage, backup and data integrity data storage (e.g. RAID mirror and/or parity storage), and other storage-server internal purposes.

Next, the storage server examines its network connections to obtain useable network addresses (650). In some environments, the Dynamic Host Configuration Protocol ("DHCP") may be used to obtain an Internet Protocol ("IP") address. In other environments, the storage server may be able to identify an unused address by watching network traffic ("sniffing" or "snooping") to identify addresses that are in use, and testing one that does not seem to be in use.

Network sniffing or snooping can also be used to identify storage protocols that are in use (660), and the storage server can automatically create one or more storage volumes that is/are accessible by those protocols (670), using default values for configuration parameters. For example, a storage volume could be created that permits read access to any client system, and write access to client systems that provide a verifiable authentication key, token or password. Authentication information may be managed by a server on the network such as a Microsoft Windows™ Domain Controller, a Network Information Service ("NIS") server, a Kerberos ticket-granting server, or another similar device.

A storage server may have other subsystems that require configuration or initialization; these are also set up with values consistent with the basic functionality to be provided by this auto-configuration embodiment. Since storage servers vary significantly in their internal operations and configuration requirements, these other subsystems are not discussed here. At a minimum, however, a storage server must have a consistent, functional configuration controlling its use of installed storage media, the storage volumes it provides, and its network communications.

The automatically-determined configuration parameters are stored (680) so that the storage server will have a configuration for use in subsequent start-ups, and the server begins operation (690).

An embodiment of the invention may be a machine-readable medium having stored thereon instructions which cause a programmable processor to perform operations as described above. In other embodiments, the operations might be performed by specific hardware components that contain hardwired logic. Those operations might alternatively be performed by any combination of programmed computer components and custom hardware components.

A machine-readable medium may include any mechanism for storing or transmitting information in a form readable by a machine (e.g., a computer), including but not limited to Compact Disc Read-Only Memory (CD-ROM), Read-Only Memory (ROM), Random Access Memory (RAM), and Erasable Programmable Read-Only Memory (EPROM).

Some embodiments may combine a storage server with a machine-readable medium containing software to implement the methods described above. The software may execute on a processor within the storage server, or on a processor of a separate system. In the latter arrangement, the automatically-generated configuration constellation can be transmitted to the storage server for use there.

The applications of the present invention have been described largely by reference to specific examples and in terms of particular allocations of functionality to certain hardware and/or software components. However, those of skill in the art will recognize that application-driven storage provisioning can also be performed by software and hardware that distribute the functions of embodiments of this invention differently than herein described. Such variations and implementations are understood to be captured according to the following claims.

We claim:

1. A system comprising:
   a storage server including a processor and a memory coupled to the processor, the memory containing executable instructions to cause the processor to perform operations comprising:
      determining, without user interaction, whether operation configuration information is available in response to the storage server being powered up, wherein the operation configuration information includes at least installed storage media information, storage volume information, and network communication information,
      initializing the storage server in accordance with the operation configuration information if the operation configuration information is available,
      examining a hardware configuration to determine an available mass storage device to store data and constructs a storage volume on the available mass storage device if the operation configuration information is not available, wherein the storage volume is accessible by a storage protocol identified by the storage server, wherein the hardware configuration specifies the available mass storage device to store data to, and wherein the storage protocol is identified by at least one of network sniffing and network snooping, and
      obtaining a network address in accordance with a network connection of the storage server; and
   a configuration wizard to update the operation configuration information of the storage server in accordance with at least one application-level setup parameter, wherein the configuration wizard automatically prepares a consistent configuration constellation for the storage server in accordance with the at least one application-level setup parameter, and wherein the consistent configuration constellation does not correspond directly to the at least one application-level setup parameter, wherein the application-level setup parameter describes a function of an application being configured on the storage server.

2. The system of claim 1 wherein the configuration wizard is to execute on a processor of the storage server.

3. The system of claim 1 wherein the configuration wizard is to execute on a processor of a computer other than the storage server.

4. A method comprising:
  determining, without user interaction, whether operation configuration information for a storage server is available upon powering up the storage server, wherein the operation configuration information includes at least installed storage media information, storage volume information, and network communication information;
  if the operation configuration information is available, initializing the storage server in accordance with the operation configuration information;
  if the operation configuration information is not available, identifying a storage protocol, examining a hardware configuration to determine an available mass storage device to store data, and constructing a storage volume on the available mass storage device, wherein the storage volume is accessible by the identified storage protocol, wherein the hardware configuration specifies the available mass storage device to store data to, and wherein the storage protocol is identified by at least one of network sniffing and network snooping;
  obtaining a network address in accordance with a network connection of the storage server; and
  accepting a setup parameter pertaining to a function of the storage server, wherein the setup parameter describes a function of an application being configured on the storage server;
  automatically computing a storage server configuration parameter to control the function of the storage server in accordance with the setup parameter, wherein the storage server configuration parameter is in accordance with the setup parameter, and wherein the storage server configuration parameter does not correspond directly to the setup parameter; and
  applying the storage server configuration parameter to the storage server.

5. The method of claim 4, further comprising:
  retrieving an operational parameter from the storage server;
  automatically preparing a status value from the operational parameter; and displaying the status value.

6. The method of claim 4 wherein automatically computing comprises:
  selecting the storage server configuration parameter from a database of configuration best practices.

7. The method of claim 4 wherein the function of the storage server is a file-based storage service.

8. The method of claim 4 wherein the function of the storage server is a block-based storage service.

9. The method of claim 4 wherein the setup parameter is a name.

10. A non-transitory computer-readable medium containing executable instructions to cause a programmable processor to perform operations comprising:
  determining, without user interaction, whether operation configuration information for a storage server is available upon powering up the storage server, wherein the operation configuration information includes at least installed storage media information, storage volume information, and network communication information;
  if the operation configuration information is available, initializing the storage server in accordance with the operation configuration information;
  if the operation configuration information is not available, identifying a storage protocol, examining a hardware configuration to determine an available mass storage device to store data, and constructing a storage volume on the available mass storage device, wherein the storage volume is accessible by the identified storage protocol, wherein the hardware configuration specifies the available mass storage device to store data to, wherein the storage protocol is identified by at least one of network sniffing and network snooping;
  obtaining a network address in accordance with a network connection of the storage server;
  accepting an application-level setup value from a user, wherein the application-level setup value describes a function of an application being configured on the storage server;
  calculating a group of storage server configuration parameters in accordance with the application-level setup value, wherein the group of storage server configuration parameters is in accordance with the application-level setup value, and wherein the group of storage server configuration parameters does not correspond directly to the application-level setup value; and
  applying the group of storage server configuration parameters to control a function of a storage server.

11. The non-transitory computer-readable medium of claim 10, containing additional executable instructions to cause the programmable processor to perform operations comprising:
  retrieving a group of current operational parameters from the storage server;
  converting the group of operational parameters to a status value; and
  causing the status value to be displayed to the user.

12. The non-transitory computer-readable medium of claim 10 wherein the function is a file-based storage service.

13. The non-transitory computer-readable medium of claim 10 wherein the function is a block-based storage service.

14. The non-transitory computer-readable medium of claim 10 wherein the group of storage server configuration values is to configure a plurality of subsystems of the storage server.

15. The non-transitory computer-readable medium of claim 14 wherein one of the plurality of subsystems is a Redundant Array of Independent Disks ("RAID") subsystem.

* * * * *